United States Patent [19]
Britzke et al.

[11] Patent Number: 5,628,837
[45] Date of Patent: May 13, 1997

[54] SURFACE DECARBURIZATION OF A DRILL BIT HAVING A REFINED PRIMARY CUTTING EDGE

[75] Inventors: Robert W. Britzke; Jimmy Eason, both of Rogers, Ark.; Zhigang Fang, The Woodlands, Tex.

[73] Assignee: Rogers Tool Works, Inc., Rogers, Ark.

[21] Appl. No.: 314,511

[22] Filed: Sep. 28, 1994

Related U.S. Application Data

[63] Continuation-in-part of Ser. No. 151,801, Nov. 15, 1993, abandoned.

[51] Int. Cl.$^6$ .................................................. C23C 8/06
[52] U.S. Cl. ........................... 148/208; 148/514; 134/39
[58] Field of Search ................................ 148/208, 514, 148/674; 419/18; 134/39

[56] References Cited

U.S. PATENT DOCUMENTS

| | | | |
|---|---|---|---|
| 3,525,610 | 8/1970 | Meadows | 419/18 |
| 3,912,414 | 10/1975 | Fukura et al. | 408/230 |
| 4,116,580 | 9/1978 | Hall | 408/230 |
| 4,222,690 | 9/1980 | Hosoi | 408/230 |
| 4,381,162 | 4/1983 | Hosoi | 408/230 |
| 4,561,813 | 12/1985 | Schneider | 408/230 |
| 4,583,888 | 4/1986 | Mori et al. | 408/59 |
| 4,602,900 | 7/1986 | Arpaio, Jr. et al. | 408/230 |
| 4,605,347 | 8/1986 | Jodock et al. | 408/224 |
| 4,642,003 | 2/1987 | Yoshimura | 408/144 |
| 4,642,942 | 2/1987 | Guhring | 51/288 |
| 4,646,479 | 3/1987 | Walker et al. | 51/328 |
| 4,688,972 | 8/1987 | Kubota | 408/230 |
| 4,712,948 | 12/1987 | Kidani | 408/230 |
| 4,744,705 | 5/1988 | Imanaga | 408/230 |
| 4,759,667 | 7/1988 | Brown | 408/230 |
| 4,789,276 | 12/1988 | Clarke | 408/230 |
| 4,826,368 | 5/1989 | Tikal et al. | 408/225 |
| 4,898,503 | 2/1990 | Barish | 408/230 |
| 4,983,079 | 1/1991 | Imanaga et al. | 408/230 |
| 5,004,384 | 4/1991 | Hosoi | 408/230 |
| 5,011,342 | 4/1991 | Hsu et al. | 408/224 |
| 5,035,552 | 7/1991 | Lysenko et al. | 408/230 |
| 5,038,641 | 8/1991 | Shen et al. | 76/108.6 |
| 5,088,863 | 2/1992 | Imanaga et al. | 408/230 |
| 5,097,634 | 3/1992 | Hulme | 51/165.84 |
| 5,181,811 | 1/1993 | Hosoi | 408/230 |
| 5,186,739 | 2/1993 | Isobe et al. | 75/238 |
| 5,230,593 | 7/1993 | Imanaga et al. | 408/230 |
| 5,231,802 | 8/1993 | Hosoi | 51/288 |

FOREIGN PATENT DOCUMENTS

| | | | |
|---|---|---|---|
| A57-071714 | 5/1982 | Japan . | |
| A01-242764 | 9/1989 | Japan | 148/514 |
| A1678532 | 9/1991 | U.S.S.R. | 148/514 |

OTHER PUBLICATIONS

Sidney H. Avner, Introduction to Physical Metallurgy, pp. 129–137, 415–421, 625–631 (1974).
Modern Machine Shop, Jun. 1989, Mazoff, J., "Choose the Best Drill Point Geometry", pp. 66–67.

*Primary Examiner*—George Wyszomierski
*Attorney, Agent, or Firm*—Dickstein Shapiro Morin & Oshinsky LLP

[57] ABSTRACT

A cutting tool is decarburized by placing the tool in a protective environment, heating in this environment to a temperature of 600°–1100° C., and maintaining this temperature for a period of 15–120 minutes. The cutting tool may be a cemented carbide microdrill which contains primary cutting edges which form an angular surface on the forward end of a rake surface at the cutting tip, and a radius surface which extends from the angular surface to a flank surface which extends from an outer diameter of the cutting tip to an axis of symmetry of the tool.

7 Claims, 5 Drawing Sheets

SURFACE DECARBURIZATION OF A DRILL BIT HAVING A REFINED PRIMARY CUTTING EDGE

BACKGROUND OF THE INVENTION

This application is a continuation-in-part of U.S. application Ser. No. 08/151,801 filed on Nov. 15, 1993, now abandoned.

The present invention relates generally to a method of surface decarburizing a drill bit and more particularly to a method of surface decarburizing cemented carbide microdrills.

Microdrills generally range in diameter from about 0.002 inches to 0.125 inches. Microdrills are typically employed to form holes in single sided, double sided, and multilayer printed circuit board laminates. Microdrills may additionally be employed in any application where small holes of carefully controlled dimensions are required. Such additional applications include cameras, watches, fuel injectors and the like.

High quality holes of precise dimensions are required in printed circuit boards and other applications. This requires producing holes with minimal defects such as rough hole walls and burrs. These undesirable defects may be caused by chipped or worn drill bits. These problems and the accompanying need to reduce chipping and wear have been recognized previously. See U.S. Pat. No. 4,759,667 issued to Brown, and U.S. Pat. No. 4,561,813 issued to Schneider.

Microdrills for drilling holes in printed circuit boards must have sufficient strength and resistance to wear to satisfy the requirements of the industry. Accordingly, it is common to make such microdrills of cemented carbide to provide the strength and hardness required. A disadvantage of using cemented carbide, however, is its brittleness which causes such microdrills to be prone to chipping. This is especially so at the outer corner of the cutting edge of the drill bit which defines the wall of the hole drilled in the printed circuit board. This proneness to chipping of cemented carbide drills has been recognized previously. See U.S. Pat. No. 4,583,888 issued to Mori, et al., and U.S. Pat. No. 4,642,003 issued to Yoshimura. After the drill bit has become chipped, wear of the drill bit is accelerated.

To improve drill bit life, conventional processes have focused on heat treating the entire tool (surface and interior portion), rather than the surface. Others have also heat treated or annealed the sintered powder used in forming the drill bit rather than the finished tool in an attempt to extend drill bit life.

Attempts at improving resistance to wear and chipping of cemented carbide microdrills for printed circuit boards and other drills have been tried. Yet a superior microdrill of cemented carbide which is resistant to wear and chipping has not emerged.

SUMMARY OF THE INVENTION

The present invention alleviates to a great extent the disadvantages of the prior art by providing a method of surface decarburizing a cemented carbide microdrill to make the microdrill more chip and wear resistant.

In one aspect of the invention, a process of surface decarburizing a cemented carbide microdrill to increase resistance to wear and chipping is provided.

In another aspect of the invention, a process of surface decarburizing a cemented carbide microdrill is provided wherein the microdrill is surface hardened without hardening the interior of the microdrill below the hardened outer surface thereby providing a wear resistant layer.

In another aspect of the invention, a process of surface decarburizing a cemented carbide microdrill is provided in which a hardened outer surface layer is formed thereon that comprises eta phase, a double carbide of tungsten and cobalt, and tungsten carbide WC and cobalt metal.

In another aspect of the invention, a process of surface decarburizing a cemented carbide microdrill is provided wherein the surface decarburizing is performed following a refining of the primary cutting edges of the microdrill by forming a radius or angular surface thereon so as to provide wear and chip resistant cutting edges.

In another aspect of the present invention, a process of surface decarburizing a cemented carbide microdrill having a refined primary cutting edge to increase resistance to wear and chipping is provided.

It is an object of the present invention to provide a process of surface decarburizing a microdrill of cemented carbide for use in drilling holes in printed circuit boards to increase resistance to wear.

It is another object of the present invention to provide a method of surface decarburizing a microdrill of cemented carbide for use in drilling holes in printed circuit boards with primary cutting edges which are refined so as to be resistant to chipping and wear.

In another aspect of the present invention, a process of mass producing a refined rounded primary cutting edge on a microdrill is provided.

It is a further object of the present invention to provide a process of mass producing a refined rounded primary cutting edge on a microdrill for use in drilling holes in printed circuit boards.

Other objects and advantages of the present invention will become readily apparent from the following description and drawings which illustrate preferred embodiments of the present invention.

DETAILED DESCRIPTION OF PREFERRED EMBODIMENTS

Cemented carbide microdrills are generally made by pressing and sintering a mixture of powders of one or more metallic carbides and a smaller amount of metal such as cobalt to serve as a binder. Cemented carbides have a very high hardness and strength which makes it an advantageous material to use in the drilling applications described above. However, cemented carbides are also brittle. This can lead to chipping, especially at the outer corners of the primary cutting edges.

The purpose of surface decarburizing microdrills is to increase resistance of the cemented carbide to wear and chipping. The surface decarburizing process obtains a thin (less than 1 micron) wear resistant layer that comprises eta phase (carbon deficient carbide), a double carbide of tungsten and cobalt, e.g., $Co_3W_3C$ or $Co_3W_6C$, as well as tungsten carbide WC and cobalt metal.

Surface decarburizing of the cemented carbide microdrill is done at a temperature from 600° C. to 1100° C. for 15 to 120 minutes. To achieve the desired phase composition, the surface decarburizing process requires a controlled partial pressure of decarburizing gas, e.g., hydrogen, carbon dioxide, oxygen and other mixtures, with hydrogen being preferred, amid the general protective environment at the heat treating temperature. Surface decarburizing is preferably done at approximately 800° C. for approximately 60 minutes in the mixture of decarburizing gas.

The above surface decarburizing process may also be advantageously used on microdrills having refined cutting edges to further increase resistance to wear and chipping. The refinements may be made, for example, by various known honing methods. These refinements to the primary cutting edge of the surface decarburized cemented carbide microdrill are discussed below.

Figure 1:
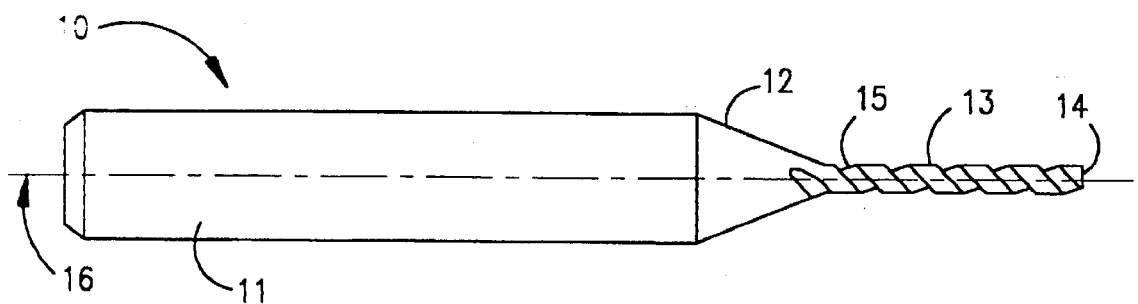
FIG. 1 is a side elevation of a microdrill according to the present invention.

Refer now to FIG. 1 which illustrates a side elevation of an embodiment of a microdrill according to the present invention. A microdrill is generally illustrated at 10 as comprising a shank 11, a tapered section 12, and a drill body 13. The drill body 13 may be provided with a slight inward taper toward the shank to provide clearance with respect to the wall of the hole being drilled. The drill body 13 comprises a cutting tip 14 and a plurality of flutes 15. The flutes extend from the cutting tip 14 and terminate in the tapered section 12. The wall of the flute at the primary cutting edge is defined by the rake surface 17. The microdrill has a longitudinal axis of symmetry 16. Wherever the elements of microdrill 10 are common to the embodiments described below, consistent numbering is used.

Figure 2:
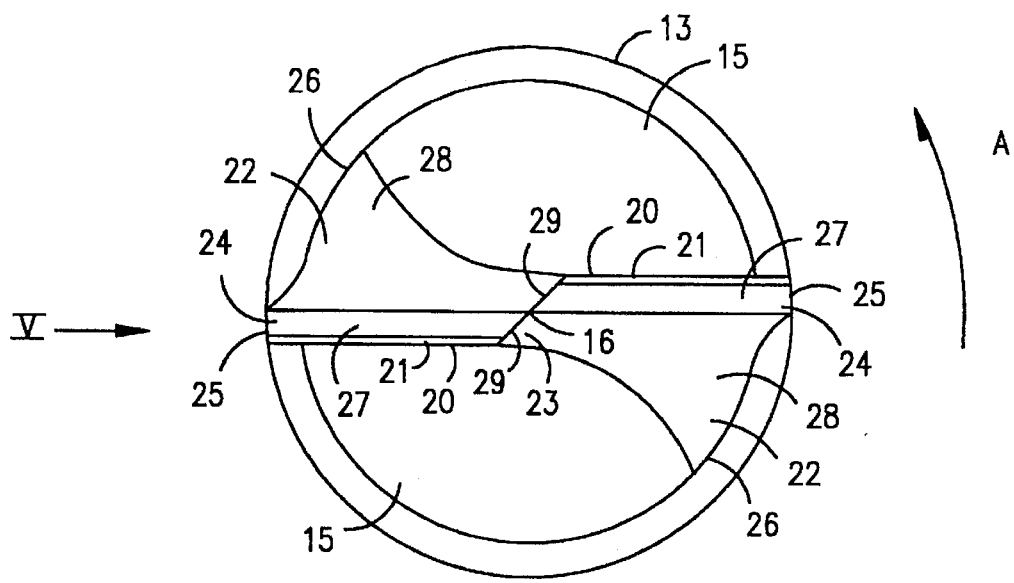
FIG. 2 is a view of the cutting tip of the first embodiment of a microdrill according to the present invention.
Figure 5A:
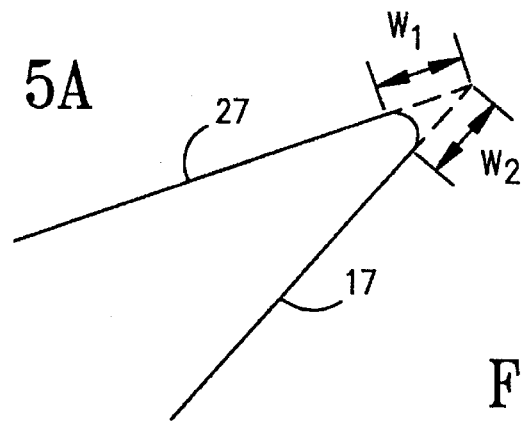
FIG. 5A is a view along direction V of the microdrill of FIG. 2.
Figure 5B:
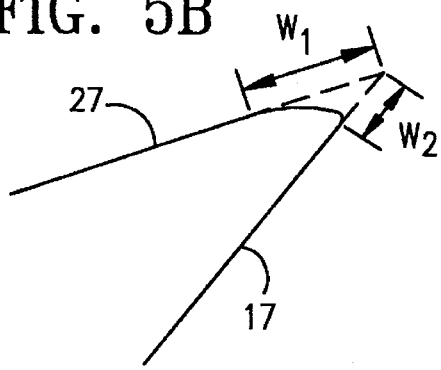
FIG. 5B is a view like FIG. 5A showing an alternate geometry.
Figure 5C:
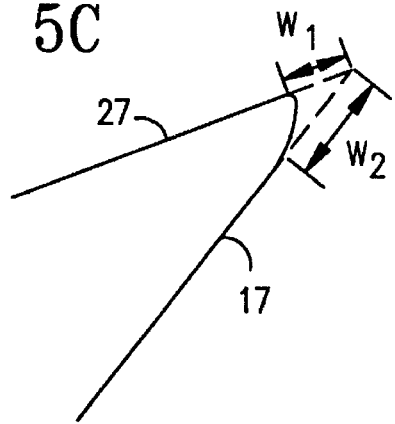
FIG. 5C is a view like FIG. 5A showing another alternate geometry.

Refer now to FIG. 2 which illustrates a view of the cutting tip of the first embodiment of a microdrill according to the present invention. The point end has primary cutting edges 20 formed at the intersection of the flank surfaces 27 with the rake surface 17. The primary cutting edges 20 have been refined by forming radius surfaces 21. The term radius surface is used throughout to indicate any curvilinear modification to the cutting edge, not limited to a true or constant radius. This configuration can best be seen in FIG. 5A which shows radius surface 21 formed at primary cutting edge 20 at the intersection of flank surface 27 and rake surface 17. Radius surface 21 extends from the forward end of the flank surface 27 to the rake surface 17. Radius surface 21 can extend along all or any portion of the primary cutting edge 20, preferably extending from the outer corner of primary cutting edge 20. The extent of the radius surface can vary from a slight polish to a heavy hone. FIG. 5B shows an alternate radius surface geometry having a curvilinear radius surface 21 with a "nwaterfall" on the flank surface 27. In FIG. 5C, the radius surface 21 has a waterfall on the rake surface 17. The distance W1 between an imaginary point where the flank surface 27 would intersect rake surface 17 and the point where the radius surface 21 intersects the flank surface 27 is at least about 0.0001 inches. The distance W2 between this imaginary point and the point where the radius surface 21 intersects the rake surface 17, is also at least about 0.0001 inches.

Returning to FIG. 2, the cutting tip additionally has side blades 22 which are formed between the flutes 15. The side blades 22 have a wing-shaped cross section and are connected together at axis 16 by the web 23. Side blades 22 spiral along the length of drill body 13 and have margins 24 at outer diameter 25. The portion of side blades 22 trailing margins 24 has reduced diameter 26 referred to as a side blade clearance diameter. Secondary surfaces 28 may be formed on the trailing edge of flank surfaces 27. In such a configuration, the intersection of secondary surface 28 with the opposite flank surface 27 forms chisel edge 29. In operation, the microdrill is rotated in direction A and thrust forward to the work piece. All cutting edges are leading edges with respect to that direction of rotation.

Figure 3:
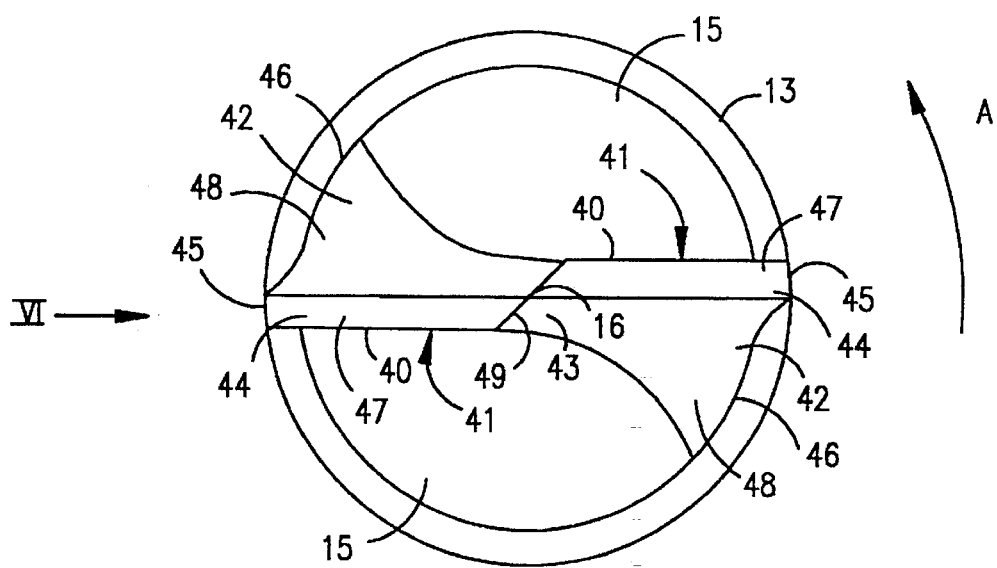
FIG. 3 is a view of the cutting tip of the second embodiment of a microdrill according to the present invention.
Figure 6:
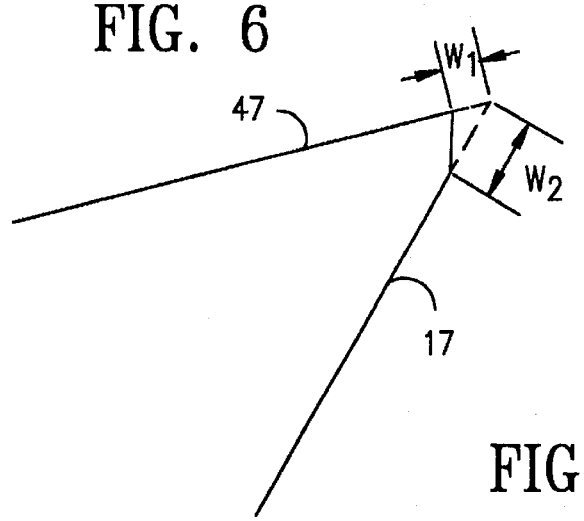
FIG. 6 is a view along direction VI of the microdrill of FIG. 3.

Refer now to FIG. 3 which illustrates a view of the cutting tip of the second embodiment of a microdrill according to the present invention. The point end has primary cutting edges 40 formed at the intersection of flank surfaces 47 with the rake surface 17. The primary cutting edges 40 have been refined by forming angular surfaces 41 ("K land"). This configuration can best be seen in FIG. 6 which shows angular surface 41 formed at the primary cutting edge 40 at the intersection of flank surface 47 and rake surface 17. Angular surface 41 is formed on the forward end of rake surface 17. Angular surface 41 can extend along all or a portion of primary cutting edge 40, preferably extending from the outer corner of the primary cutting edge 40. The distance W1 between an imaginary point where the flank surface 47 would intersect the rake surface 17 and the point where the angular surface 41 intersects the flank surface 47 is at least about 0.0001. The distance W2 between this imaginary point and the point where the angular surface 41 intersects the rake surface 17 is preferably at least about 0.0001 inches.

Returning to FIG. 3, the cutting tip additionally has side blades 42 which are formed between the flutes 15. The side blades 42 have a wing-shaped cross section and are connected together at axis 16 by the web 43. Side blades 42 spiral along the length of drill body 13 and have margins 44 at outer diameter 45. The portion of side blades 42 trailing margins 44 has reduced diameter 46 referred to as a side blade clearance diameter. Secondary surfaces 48 may be formed on the trailing edge of flank surfaces 47. In such a configuration, the intersection of secondary surface 48 with the opposite flank surface 47 forms chisel edge 49. In operation, the microdrill is rotated in direction A and thrust forward to the work piece. All cutting edges are leading edges with respect to that direction of rotation.

Figure 4:
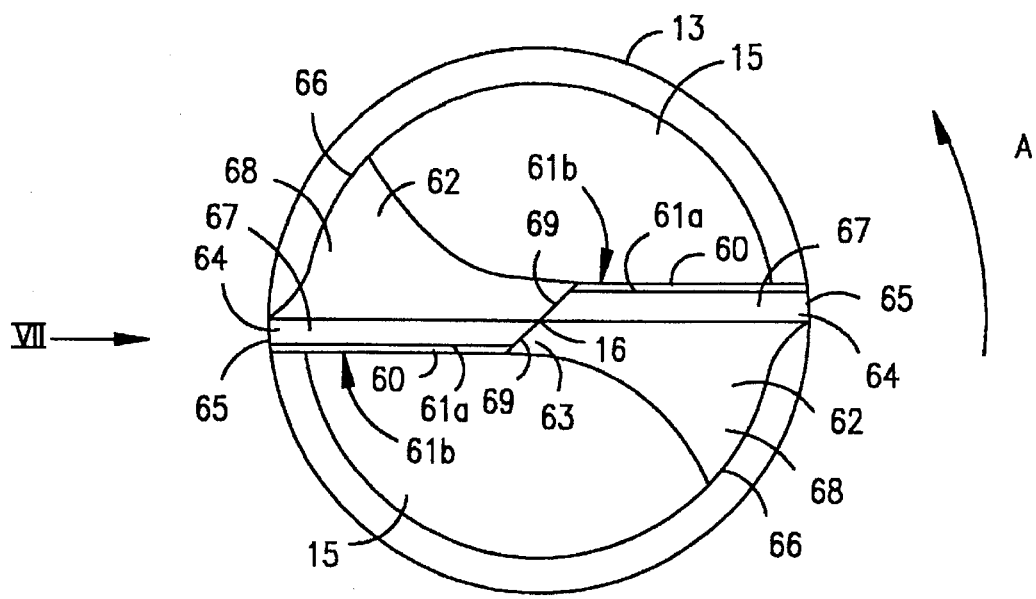
FIG. 4 is a view of the cutting tip of the third embodiment of a microdrill according to the present invention.
Figure 7A:
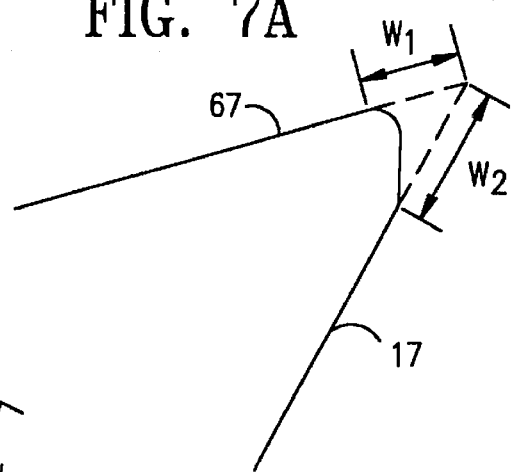
FIG. 7A is a view along direction VII of the microdrill of FIG. 4.
Figure 7B:
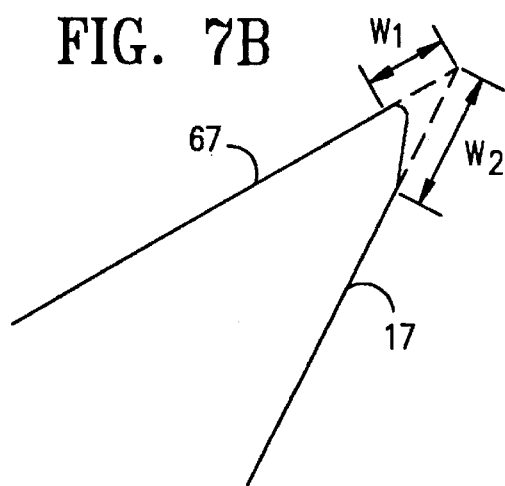
FIG. 7B is a view like FIG. 7A showing an alternate geometry.
Figure 7C:
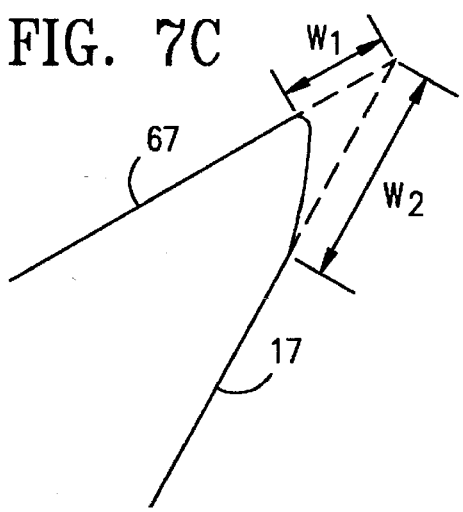
FIG. 7C is a view like FIG. 7A showing another alternate geometry.

Refer now to FIG. 4 which illustrates a view of the cutting tip of the third embodiment of a microdrill according to the present invention. The point end has primary cutting edges 60 formed at the intersection of flank surfaces 67 with the rake surface 17. The primary cutting edges 60 have been refined by forming radius surfaces 61a and angular surfaces 61b. This configuration can best be seen in FIG. 7A which shows radius surface 61a and angular surface 61b formed at the primary cutting edge 60. Angular surface 61b is formed at the forward end of rake surface 17. Radius surface 61a extends from the forward end of the angular surface 61b to the flank surface 67. Angular surface 61b and radius surface 61a may extend along all or any portion of primary cutting edge 60, preferably extending from the outer corner of cutting edge 60. FIG. 7B shows an alternate geometry in which the radius surface 61a is a curvilinear surface having a waterfall on the flank surface 67. In FIG. 7C, the radius surface has a waterfall on the angular surface 61b. The distance W1 between an imaginary point where the flank surface 67 would intersect the rake surface 17 and the point where the radius surface 61a intersects the flank surface 67 is preferably at least 0.0001 inches. The distance W2 between this imaginary point and the point where the angular surface 61b intersects the rake surface 17 is preferably at least 0.0001 inches.

Returning to FIG. 4, the cutting tip additionally has side blades 62 which are formed between the flutes 15. The side blades 62 have a wing-shaped cross section and are connected together at axis 16 by the web 63. Side blades 62 spiral along the length of drill body 13 and have margins 44 at outer diameter 65. The portion of side blades 62 trailing margins 64 has reduced diameter 66 referred to as a side blade clearance diameter. Secondary surfaces 68 may be formed on the trailing edge of flank surfaces 67. In such a configuration, the intersection of secondary surface 68 with the opposite flank surface 67 forms chisel edge 69. In operation, the microdrill is rotated in direction A and thrust forward to the work piece. All cutting edges are leading edges with respect to that direction of rotation.

In each of the first three embodiments, the refinement of the cutting edge makes it more resistant to chipping and wear. A cutting edge is most susceptible to wear and chipping at the sharp edge formed at the intersection of the flute and flank surface. Adding a radius, angular surface, or combination of the two eliminates the thinnest portion of the cutting edge. The resulting cutting edge is thereby stronger.

Each of the first three embodiments was described as having a facet configuration. The present invention is not limited to such a configuration, and may be, for instance, included on a drill bit having a jobber point.

Figure 8:
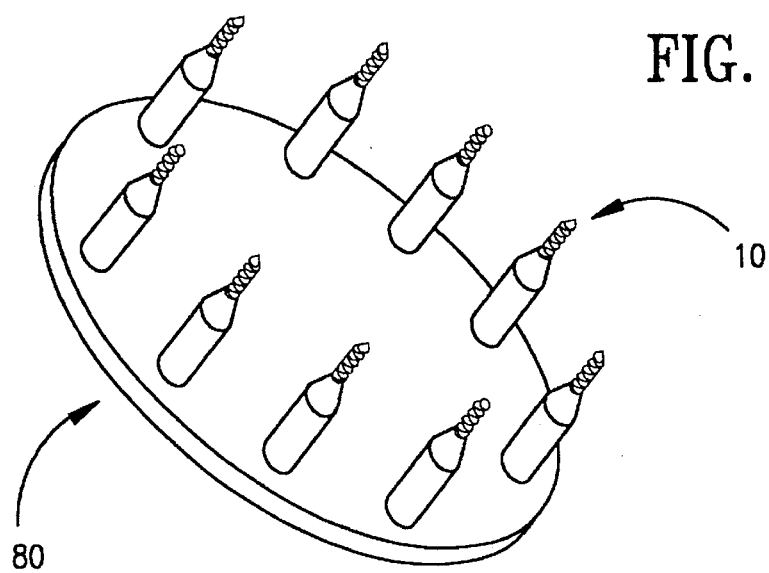
FIG. 8 is a perspective view of microdrills mounted in a carrier plate to have the primary cutting edges refined according to the present invention.
Figure 9:
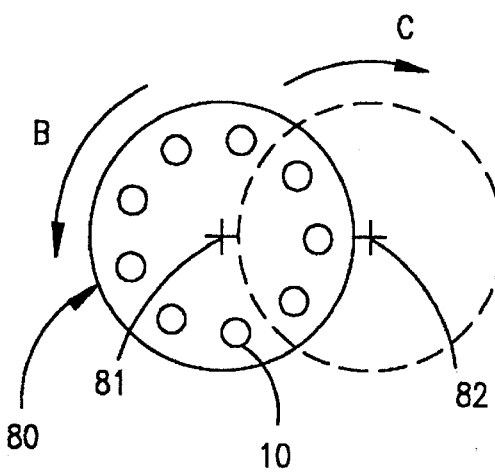
FIG. 9 is a schematic top plan view illustrating the motion of the microdrills having their primary cutting edges refined according to the present invention.
Figure 10:
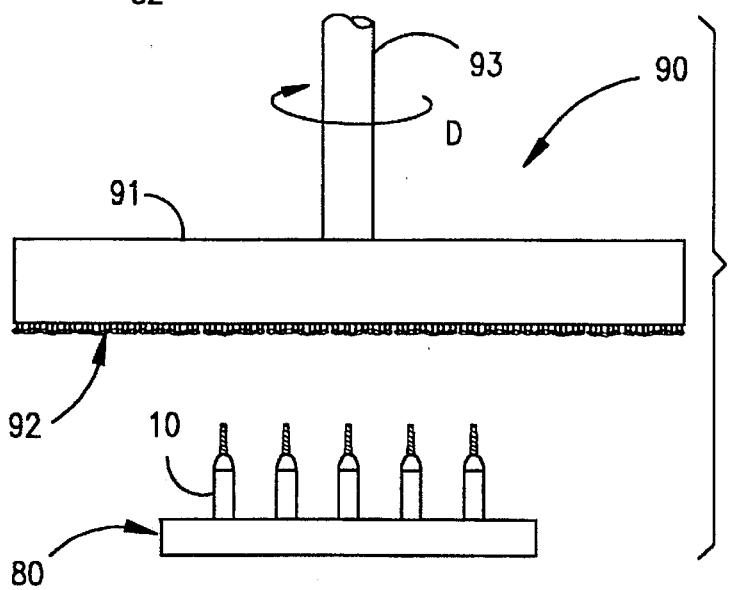
FIG. 10 is a side elevation of the microdrills having their primary cutting edges refined according to the present invention.

Refer now to FIGS. 8-10 which illustrate a process of the present invention of refining the microdrill by forming a radius on the primary cutting edges. The microdrills 10 are placed vertically in a round carrier plate 80 which is then placed in a machine which rotates carrier plate 80 in a planetary motion. This planetary motion is illustrated schematically in FIG. 9, where it is shown that round carrier plate 80 rotates about its own axis 81 in direction B. Simultaneously, the carrier plate 80 is translated in direction C about center of rotation 82. While this planetary motion is occurring, a large rotating brush 90 is lowered into contact with the microdrills 10 as shown in FIG. 10. The large rotating brush 90 comprises a brush 91 having diamond paste applied to it on surface 92 or which has already been impregnated with diamond paste on surface 92. The brush is rotated in direction D about shaft 93. The rotating brush 90 is lowered into contact with the cutting tips 14 of the microdrills 10 while they are subject to the planetary motion as illustrated in FIG. 9. The abrasive action of the diamond paste produces a radius cutting edge 21, 61a on the primary cutting edges 20, 60 of microdrills 10 of controlled size and shape as described above with respect to the first and third embodiments of the present invention. The extent of the abrasive process may range from a slight polish to a more heavy hone. Of course, carrier plate 80 may be moved in a manner other than planetary motion while the rotating brush 90 is contacted with the microdrills 10.

All three of the embodiments of the microdrill discussed above may be further modified by a surface decarburizing process. The surface decarburizing process can be done at a temperature from 600° C. to 1100° C. for 15 to 120 minutes. Surface decarburizing should take place in a controlled partial pressure of decarburizing gas, e.g., hydrogen, carbon dioxide, oxygen and other mixtures, with hydrogen being preferred, amid the general protective environment at the heat treating temperature. Surface decarburizing can preferably be done at approximately 800° C. for approximately 60 minutes in a mixture of argon and hydrogen.

Cemented carbide microdrills are generally made by pressing and sintering a mixture of powders of one or more metallic carbides and a smaller amount of metal such as cobalt to serve as a binder. Cemented carbides have a very high hardness and strength which makes it an advantageous material to use in the drilling applications described above. However, cemented carbides are also brittle. This can lead to chipping, especially at the outer corners of the primary cutting edges. Surface decarburizing the microdrills increases resistance of the cemented carbide to wear as discussed above. Accordingly, the surface decarburizing process in combination with the refined primary cutting edges further increases the resistance to chipping and wear of the microdrills according to the present invention.

Figure 11:
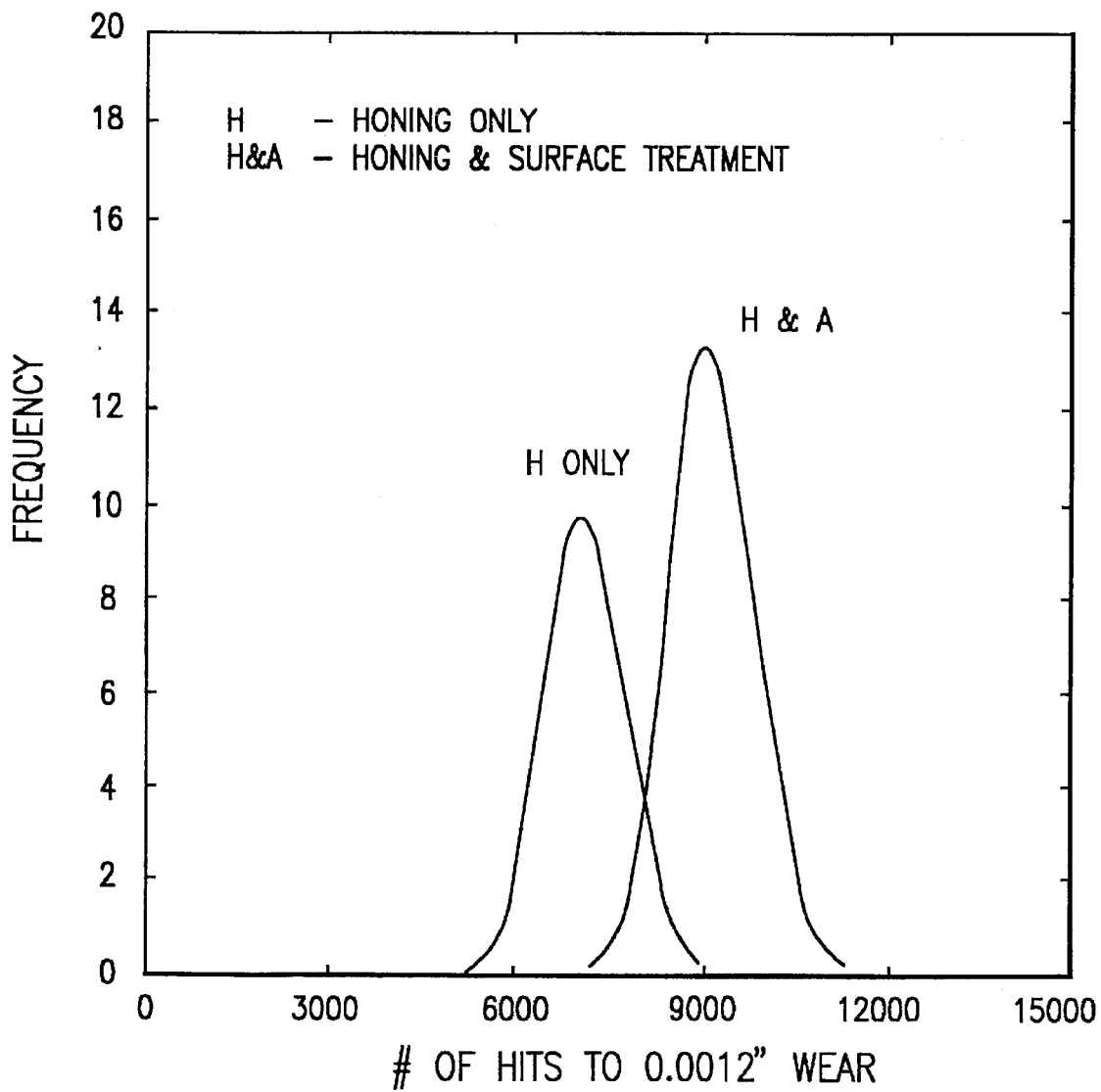
FIG. 11 is a graph depicting tool life test results showing the effect of the disclosed surface decarburization process according to the present invention.

Refer now to FIG. 11 which illustrates a distribution plot of drill life (number of holes drilled in fiberglass epoxy copper laminate) for the drill bits processed according to the present invention. The H curve illustrates a drill bit which has been honed only. The H & A curve illustrates a drill bit which has been honed and surface decarburized. The drill life for the H & A heat treated drill bits is approximately 2-5 times longer than for conventionally formed drill bits which have ground primary cutting edges.

In each of the above embodiments, the surface decarburized cemented carbide microdrill includes a refined cutting edge to make it more resistant to chipping and wear. A cutting edge is most susceptible to wear and chipping at the sharp edge formed at the intersection of the flute and flank surface. Adding a radius, angular surface, or combination of the two to the surface decarburized cemented carbide microdrill eliminates the thinnest portion of the cutting edge. The resulting cutting edge is thereby stronger.

Each of the above embodiments of surface decarburized cemented carbide microdrills was described as having a facet configuration. The present invention is not limited to such a configuration, and may be, for instance, included on a surface decarburized cemented carbide drill bit having a jobber point.

The above description and drawings are only illustrative of preferred embodiments which achieve the objects, features and advantages of the present invention, and it is not intended that the present invention be limited thereto. For example, the surface decarburizing process of the present invention could advantageously be used on other cemented carbide drill bits not limited to microdrills or drills having split points. Furthermore, the surface decarburizing process could be used on other types of cemented carbide cutting tools. The modified cutting edges of the present invention could also be used on other types of drill bits or rotating cutting tools generally.

What is claimed as new and desired to be protected by letters patent of the U.S. is:

1. A method of surface decarburizing a cemented carbide cutting tool, comprising the steps of:

placing the cutting tool in a protective environment;

heating the cutting tool to an elevated temperature of about 800° C. while the cutting tool is in said protective environment; and maintaining the cutting tool at said elevated temperature for a time of about 60 minutes, wherein said protective environment comprises a controlled partial pressure of decarburizing gas.

2. A method of surface decarburizing a cemented carbide cutting tool, comprising the steps of:

placing the cutting tool in a protective environment;

heating the cutting tool to an elevated temperature of about 800° C. while the cutting tool is in said protective environment; and maintaining the cutting tool at said elevated temperature for a time of about 60 minutes, wherein said protective environment is a gas selected from the group consisting of hydrogen, carbon dioxide, oxygen and mixtures thereof.

3. A method of surface decarburizing a cemented carbide microdrill, comprising the steps of:

placing the microdrill in a protective environment;

heating the microdrill to an elevated temperature of about 800° C. while the microdrill is in said protective environment; and maintaining the microdrill at said elevated temperature for a time of about 60 minutes, wherein said protective environment comprises a controlled partial pressure of decarburizing gas.

4. A method of surface decarburizing a cemented carbide microdrill, comprising the steps of:

placing the microdrill in a protective environment;

heating the microdrill to an elevated temperature of about 800° C. while the microdrill is in the protective environment; and maintaining the microdrill at said elevated temperature for a time of about 60 minutes, wherein said protective environment is a gas selected from the group consisting of hydrogen, carbon dioxide, oxygen and mixtures thereof.

5. A method of surface decarburizing a cemented carbide microdrill, wherein said microdrill includes:

a drill body having a cutting tip, an axis of symmetry, and a plurality of flutes, wherein said flutes have a rake surface at said cutting tip, and said cutting tip includes a plurality of side blades between said flutes and joined at a web, a plurality of flank surfaces extending from an outer diameter of said cutting tip to said axis of symmetry and a plurality of primary cutting edges at the intersection of said flank surfaces with said rake surfaces, the method comprising the steps of:

refining said primary cutting edges such that a radius surface extends from said flank surfaces to said rake surfaces;

placing the microdrill in a protective environment;

heating the microdrill to an elevated temperature of between 600° C. and 1100° C. while the microdrill is in the protective environment; and maintaining the microdrill at said elevated temperature for a time of between 15 and 120 minutes.

6. A method of surface decarburizing a cemented carbide microdrill, wherein said microdrill includes:

a drill body having a cutting tip, an axis of symmetry, and a plurality of flutes, wherein said flutes have a rake surface at said cutting tip, and said cutting tip includes a plurality of side blades between said flutes and joined at a web, a plurality of flank surfaces extending from an outer diameter of said cutting tip to said axis of symmetry and a plurality of primary cutting edges at the intersection of said flank surfaces with said rake surfaces, the method comprising the steps of:

refining said primary cutting edges to form an angular surface on the forward end of said rake surfaces;

placing the microdrill in a protective environment;

heating the microdrill to an elevated temperature of between 600° C. and 1100° C. while the microdrill is in the protective environment; and maintaining the microdrill at said elevated temperature for a time of between 15 and 120 minutes.

7. A method of surface decarburizing a cemented carbide microdrill, wherein said microdrill includes:

a drill body having a cutting tip, an axis of symmetry, and a plurality of flutes, wherein said flutes have a rake surface at said cutting tip, and said cutting tip includes a plurality of side blades between said flutes and joined at a web, a plurality of flank surfaces extending from an outer diameter of said cutting tip to said axis of symmetry and a plurality of primary cutting edges at the intersection of said flank surfaces with said rake surfaces, the method comprising the steps of:

refining said primary cutting edges to form an angular surface on the forward end of said rake surface, and a radius surface that extends from said angular surface to said flank surface;

placing the microdrill in a protective environment;

heating the microdrill to an elevated temperature of between 600° C. and 1100° C. while the microdrill is in the protective environment; and maintaining the microdrill at said elevated temperature for a time of between 15 and 120 minutes.

* * * * *